US011286330B2

(12) United States Patent
Petrovic et al.

(10) Patent No.: US 11,286,330 B2
(45) Date of Patent: Mar. 29, 2022

(54) MACROMER FOR USE IN POLYMER POLYOL DISPERSIONS, AND METHOD FOR PRODUCING SUCH A MACROMER

(71) Applicant: BASF SE, Ludwigshafen am Rhein (DE)

(72) Inventors: Dejan Petrovic, Lemfoerde (DE); Christian Koenig, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 334 days.

(21) Appl. No.: 16/331,400

(22) PCT Filed: Aug. 29, 2017

(86) PCT No.: PCT/EP2017/071583
§ 371 (c)(1),
(2) Date: Mar. 7, 2019

(87) PCT Pub. No.: WO2018/046333
PCT Pub. Date: Mar. 15, 2018

(65) Prior Publication Data
US 2019/0202970 A1    Jul. 4, 2019

(30) Foreign Application Priority Data
Sep. 8, 2016  (EP) .................................... 16187879

(51) Int. Cl.
*C08G 18/63*  (2006.01)
*C08G 18/08*  (2006.01)
*C08G 18/10*  (2006.01)
*C08G 18/24*  (2006.01)
*C08G 18/48*  (2006.01)
*C08G 18/81*  (2006.01)
*C08J 9/04*   (2006.01)
*C08G 101/00* (2006.01)

(52) U.S. Cl.
CPC ....... *C08G 18/632* (2013.01); *C08G 18/0876* (2013.01); *C08G 18/10* (2013.01); *C08G 18/246* (2013.01); *C08G 18/4829* (2013.01); *C08G 18/4858* (2013.01); *C08G 18/8108* (2013.01); *C08J 9/04* (2013.01); *C08G 2101/00* (2013.01); *C08J 2375/14* (2013.01)

(58) Field of Classification Search
None
See application file for complete search history.

(56) References Cited

U.S. PATENT DOCUMENTS

| 4,390,645 | A | * | 6/1983 | Hoffman | ............... C08F 291/08 521/137 |
| 4,522,976 | A | | 6/1985 | Grace et al. | |
| 5,093,412 | A | | 3/1992 | Mente et al. | |
| 5,196,476 | A | * | 3/1993 | Simroth | ............... C08F 283/06 524/769 |
| 6,013,731 | A | * | 1/2000 | Holeschovsky | ...... C08F 283/06 525/123 |
| 10,294,336 | B2 | | 5/2019 | Koenig et al. | |
| 2006/0025491 | A1 | | 2/2006 | Adkins et al. | |
| 2017/0051097 | A1 | | 2/2017 | Koenig et al. | |

FOREIGN PATENT DOCUMENTS

| DE | 10 2011 078 170 A1 | 12/2011 |
| EP | 0 162 589 A1 | 11/1985 |
| EP | 1 624 006 A1 | 2/2006 |
| EP | 1 930 356 A2 | 6/2008 |
| WO | WO 03/009718 A1 | 2/2003 |
| WO | WO 2015/165878 A1 | 11/2015 |

OTHER PUBLICATIONS

Vertellus, "Coscat 83 Safety Data Sheet," p. 1-7, 2019 (Year: 2019).*
International Search Report dated Dec. 8, 2017 in PCT/EP2017/071583 filed Aug. 29, 2017.
U.S. Appl. No. 15/771,533, filed Apr. 27, 2018, US 2018-0346636 A1, Sebastian Koch, et al.
U.S. Appl. No. 16/310,250, filed Dec. 14, 2018, Christian Koenig, et al.
U.S. Appl. No. 16/320,676, filed Jan. 25, 2019, US 2019/0153144 A1, Christian Koenig, et al.
Extended European Search Report dated Feb. 16, 2017 in Patent Application No. 16187879.8 (with English translation of categories of cited documents), 4 pages.
International Search Report dated Dec. 8, 2017 in PCT/EP2017/071583 (English translation previously filed), 3 pages.

* cited by examiner

*Primary Examiner* — Randy P Gulakowski
*Assistant Examiner* — Ha S Nguyen
(74) *Attorney, Agent, or Firm* — Grüneberg and Myers PLLC

(57) ABSTRACT

The present invention is concerned with a new macromer for use in polymer polyol dispersions, and also with a process for preparing a new macromer of this kind.

12 Claims, No Drawings

MACROMER FOR USE IN POLYMER POLYOL DISPERSIONS, AND METHOD FOR PRODUCING SUCH A MACROMER

The present invention is concerned with a new macromer for use in polymer polyol dispersions, and also with a process for preparing a new macromer of this kind.

Moreover, the present invention concerns a process for preparing a polymer polyol dispersion using the new macromer, and also the use of a polymer polyol dispersion that can be generated in this way for producing a polyurethane.

The production of polyurethane plastics by reaction of isocyanates with OH-active substances is carried out in some cases using polymer polyol dispersions (also called "graft polyols").

Processes of this kind are known in principle.

There are numerous known methods for introducing ethylenically unsaturated functionalities into polyols and using them to prepare macromers. A number of examples are shown in U.S. Pat. No. 6,013,731 or EP 0,162,589.

There are a large number of variant methods for preparing polymer polyol dispersions. As well as the use of macromers, which are used in the radical polymerization for preparing the polymer polys, an additional possibility is that of using prefabricated stabilizers. Prefabricated stabilizers are products which are obtained by reaction of macromers carrying reactive unsaturated groups with monomers that are polymerizable radically. These prefabricated stabilizers can then be used in a further radical polymerization to prepare polymer poly dispersions. EP 1 930 356 B1, for example, describes exclusively such processes.

It is known that, in particular, molecules of high molecular weight and high steric bulk are particularly suitable for use in the preparation of effective macromers. The efficiency of macromers is manifested in the need for a smaller amount of this compound in order to prepare polymer polyol dispersions having sufficient stability, low viscosity and/or ready filterability.

As mentioned above, it is common knowledge that so-called macromers are used for the preparation and stabilization of polymer polyol dispersions. In such use, however, as indicated above, problems recur, since the use of such macromers in many cases leads to polymer dispersions which have a high viscosity and/or poor filterability, thereby making processing and use more difficult.

DE102011078170 describes, for example, a process for preparing macromers by reacting a polyol with an ethylenically unsaturated isocyanate in the presence of a catalyst based on zinc and/or bismuth carboxylate and also the use of this macromer for preparing polymer dispersions. In example A, 192 kg of a polyetherol with a functionality of 6 and an OH number of 18.4 mg KOH/g were reacted with 1.69 kg of TMI, corresponding to 0.9 wt % of 1,1-dimethyl-meta-isopropenylbenzyl isocyanate (TMI), based on the end product. In example B, this end product is used for preparing polymer polyols, in the examples, a macromer is prepared from a hexafunctional polyol (MW 18 000) with 0.8 eq of TMI. Claimed are macromers with F=2-6. OH number 10-200, with Zn or Bi catalysts.

WO 20003/09718 describes a continuous process for preparing graft polyols using macromers. The macromers described herein possess 0.1 to 1 mol, preferably 0.2 to 0.8 mol, of unsaturated units per molecule. In the examples, in the case of macromer B, a trifunctional, glycerol-based polyol having an average molecular weight of 61 200 and an OH number of 27.5 mg KOH/g is prepared by reaction with 0.3 mol of TMI per mole of macromer. These macromers are subsequently used for preparing graft polyols. The preparation of macromers on the basis of sorbitol-based polyols is not described herein.

U.S. Pat. No. 4,522,976 describes a polymer polyol dispersion prepared by free radical polymerization in the presence of a macromer with an equivalent weight of 100 to 10 000, preferably 2000 to 6000. The number of unsaturated groups in these macromers is in the range from 0.1 mol to 1.5 mol per mole of polyol, but preferably 0.5 to 1 mol per molecule of the polyol. The examples describe macromers based on maleic anhydride.

US20060025491 describes stable polyols of low viscosity which can be prepared by using prefabricated stabilizers. The macromers prepared are used for preparing the prefabricated stabilizer and are not added directly during the preparation of the polymer polyol dispersions.

U.S. Pat. No. 5,093,412 discloses storage-stable macromers prepared by reaction with arylaliphatic isocyanates with polyols. These macromers are used for preparing graft polyols. In example 1, a trifunctional polyol having an OH number of 26.6 mg KOH/g is reacted with TMI. The number of unsaturated groups is between 0.4 to 0.7 mol per mole of polyol.

EP 1 624 006 A1 describes polymer polyols for rigid polyurethane foams, these polyols being prepared from a "pre-formed stabilizer". This necessitates a two-stage process in which first of all a stabilizer is prepared from a macromer, the polymer polyol being obtained from this stabilizer in a second step. The structure of such polymer polyols is different from comparable products obtained from a single-stage process without the use of a "pre-formed stabilizer".

The existing macromers and processes for preparing them still have certain disadvantages and problems. Oftentimes, for instance, the viscosity of the dispersions prepared from them is relatively high and/or filtration takes a considerable time.

The object arising was therefore that of providing a process for preparing a macromer, for use in polymer polyol dispersions, that affords dispersions having a very low viscosity and/or ready filterability.

It has now surprisingly been found that a process for preparing a macromer, using a certain amount of an unsaturated isocyanate compound, 1,1-dimethyl-meta-isopropenylbenzyl isocyanate (TMI) for example, affords the desired results. According to the theory, the expectation was of 1 mol of TMI per polyol being ideal. However, it has now been found that TMI contents of 1.1 to 1.8 mol of TMI per molecule of macromer, more particularly 1.5 to 1.8 mot of TMI per molecule of macromer, lead to the best results, especially with regard to filterability.

The subject of the present invention is therefore a process for preparing a macromer by catalyzed reaction of a hexafunctional polyol P with at least one unsaturated isocyanate compound V which contains at least one isocyanate group reactive with a Zerewitinoff-active compound, using 1.1 to 1.8 mol of the unsaturated isocyanate compound V, preferably 1.5 to 1.8 mol of the unsaturated isocyanate compound V, based on the end product, and a catalyst K. Further subjects are also a macromer preparable by the process of the invention, a process for preparing a polymer polyol dispersion using at least one macromer preparable by the process of the invention, and also the use of a polymer polyol dispersion preparable in accordance with the invention for producing a polyurethane by reaction with at least one di- or polyisocyanate and electively at least one blowing agent.

In one preferred embodiment of the process of the invention, the macromer M is obtained by reacting 1,1-dimethyl-meta-isopropenylbenzyl isocyanate (TMI) with a polyether polyol PM, optionally in the presence of a Lewis acid catalyst.

Preferably the EO content of the end-product macromer is between 1% and 25%, preferably 2% and 15%, more preferably between 3% and 8%.

The unsaturated isocyanate compound V preferably contains precisely one isocyanate group reactive with a Zerewitinoff-active compound. More preferably the unsaturated compound V is 1,1-dimethyl-meta-isopropenylbenzyl isocyanate (TMI).

The polyol P is prepared in one embodiment by reacting sorbitol with at least one alkylene oxide, preferably with a mixture of ethylene oxide (EO) and propylene oxide (PO), with catalysis by base. The basic catalyst in this case is preferably selected from the group consisting of potassium hydroxide and cesium hydroxide, more preferably cesium hydroxide.

In one particularly preferred embodiment of the process of the invention, the polyol P is prepared by reacting sorbitol with a mixture of ethylene oxide (EO) and propylene oxide (PO) with catalysis by cesium hydroxide.

In a further embodiment of the process of the invention, the polyol P has a molecular weight Mw of 5000 to 25 000 g/mol, preferably 7000 to 22 000 g/mol, more preferably 10 000 to 19 000 g/mol, the molecular weight Mw being determined arithmetically from the OH number, determined according to DIN 53240 of November 2007.

The catalyst K employed in the process of the invention for preparing a macromer preferably comprises tin or bismuth. Employed with particular preference as catalyst is dibutyltin dilaureate (DBTL).

The catalyzed reaction with at least one unsaturated isocyanate compound V in the process of the invention for preparing a macromer takes place in general at a temperature of 60 to 150° C., preferably 80 to 130° C., and a pressure of 0.5 to 2 bar, preferably 0.8 to 1.2 bar.

The macromer preparable in accordance with the invention generally has a molecular weight Mw of 5000 to 25 000 g/mol, preferably 7000 to 22 000 g/mol, more preferably 1000 to 19 000 g/mol, the molecular weight Mw being determined arithmetically from the OH number, determined according to DIN 53240 of November 2007.

As already mentioned, the macromer preparable in accordance with the invention can be used in a process for preparing a polymer polyol dispersion. For this purpose, for example, 0.5 to 10 wt % of at least one macromer preparable by the process of the invention, preferably 1 to 8 wt %, more preferably 2 to 5 wt %, is reacted with at least one polyether polyol and also styrene and acrylonitrile.

In turn, the polymer polyol dispersion preparable in this way can be used in a process for producing polyurethane foams. For that purpose, the polymer polyol dispersion preparable by the process of the invention, optionally with further polyol compounds, can be reacted with at least one di- or polyisocyanate compound, selectively in the presence of at least one blowing agent.

Measurement Methods

The viscosity was determined at 25° C. according to DIN EN ISO 3219 from 1994, using a Rheotec RC20 rotational viscometer and a CC 25 DIN spindle (spindle diameter: 12.5 mm; measuring cylinder internal diameter: 13.56 mm) at a shear rate of 100 1/s (instead of 50 1/s).

The OH number is determined according to DIN 53240 of November 2007.

EXAMPLES

A number of examples are indicated below in order to illustrate the invention. These examples are not intended in any way to limit the scope of the invention, but are instead to be understood merely as being illustrative.

The polyetherol 1 is a trifunctional polyetherol based on glycerol as starter with a hydroxyl number of 56 mg KOH/g, determined according to DIN 53240, and prepared by KOH catalysis. The polyetherol 2 used is a hexafunctional polyetherol based on sorbitol as starter with a hydroxyl number of 20.9 mg KOH/g, determined according to DIN 53240, and prepared by CsOH catalysis.

Calculation of the alpha,alpha-dimethyl-meta-isopropenylbenzyl isocyanate (TMI) feed amount The calculation of the amount of TMI used is calculated as follows. Starting from the hydroxyl number of the polyetherol 2 used and from the functionality, the average molar mass is calculated. In this case, the functionality of the polyetherol 2 used is 6 and the hydroxyl number is 20.9 mg of KOH/g. The molar mass is calculated using the following formula, in which z is the functionality of the polyetherol:

$$Mn = 1000 \text{ mg/g} \cdot \frac{z \cdot 56.106 \text{ g/mol}}{OHN \text{ [mg/g]}}$$

This gives a calculated molar mass of 16 107 g/mol. This molar mass is used as the basis for calculating the amount of TMI added. The use, for example, of 1 equivalent of the TMI per molecule of polyetherol in the macromer would mean the reaction, for example, of 1 mol of polyetherol with 1 mol of TMI.

General synthesis protocol for macromer preparation, taking macromer number 2 as an example 500 g of polyetherol 2 were heated to 80° C. in a stirred glass reactor and dried at 8 mbar for 60 minutes. The glass reactor was subsequently inertized, 0.03 g of dibutyltin dilaureate (DBTL) was added, and stirring was continued for 30 minutes. Subsequently, over 30 minutes and at 80° C., 5 g of alpha,alpha-dimethyl-meta-isopropenylbenzyl isocyanate (TMI) were added, corresponding to 0.8 equivalent of TMI per molecule of polyetherol 2. After the end of the addition, stirring at this temperature was continued for 180 minutes. After the stirring time, 0.03 g of 85% phosphoric acid and 4 ml of ethanol were added, and stirring was continued for 30 minutes. This was followed by evacuation at 85° C. and 20 mbar for 60 minutes.

TABLE 1

Macromers prepared

| Macromer number | Equivalents of TMI per molecule of polyetherol 2 in the macromer | Added amount of TMI in g |
| --- | --- | --- |
| 1 | 0.5 | 3.1 |
| 2 | 0.8 | 5.0 |
| 3 | 1.1 | 6.9 |
| 4 | 1.3 | 8.1 |
| 5 | 1.5 | 9.4 |
| 6 | 1.8 | 11.2 |
| 7 | 2 | 12.8 |
| 8 | 2.5 | 15.6 |

General Experimental Protocol for the Preparation of Polymer Polyols 517.2 g of polyetherol 1 were initially charged to a stirred glass reactor, together with 3.06 g of the previously prepared macromer, and this initial charge was heated to 125° C. under an inert gas atmosphere. Subsequently, over 150 minutes, via the first feed stream, 558.79 g of styrene, 279.32 g of acrylonitrile, 8.79 g of dodecanethiol, and 34.61 g of the previously prepared macromer were added and, via a second, 3.92 g of Wako V601 (dimethyl 2,2'-azobis(2-methylpropionate)) in solution in 517.2 g of polyetherol 1 were added. After a reaction time of 15 minutes, the product was freed from residual monomers by application of a vacuum of 15 mbar. The OH number of the products is in the range of 31-33 mg KOH/g KOH.

TABLE 2

Polymer polyols prepared

| Polymer polyol number | Macromer number | Viscosity in mPas |
|---|---|---|
| 1 | 1 | 4586 |
| 2 | 2 | 4580 |
| 3 | 3 | 4611 |
| 4 | 4 | 4543 |
| 5 | 5 | 4523 |
| 6 | 6 | 4654 |
| 7 | 7 | 5008 |
| 8 | 8 | gelling |

Filtration Results

To investigate the filterability, the above-prepared dispersions were filtered through a 30 μm gap edge filter under a constant superatmospheric pressure of 1 bar at 28° C., and the amount of the filtered material was monitored over time. The higher filtration rate, the more suitable the product is for processing.

TABLE 3

Filtration results of the polymer polyols is prepared

| Polymer polyol number | Equivalents of TMI per molecule of polyetherol in the macromer | Measured filtration rate | Filtration rate calculated for 100 s |
|---|---|---|---|
| 1 | 0.5 | 7.8 g in 600 s | 1.3 g |
| 2 | 0.8 | 77.0 g in 600 s | 12.8 g |
| 3 | 1.1 | 184.1 g in 600 s | 30.7 g |
| 4 | 1.3 | 180.4 g in 415 s | 43.5 g |
| 5 | 1.5 | 188.8 g in 310 s | 60.9 g |
| 6 | 1.8 | 189.5 g in 275 s | 68.9 g |
| 7 | 2 | 38 g in 600 s | 6.3 g |
| 8 | 2.5 | filtration not possible | filtration not possible |

Figure 1: Filtration Rates

From this plot it is apparent that in the range between 1.3 and 1.8 TMI per molecule and in particular in the range between 1.5 and 1.8 TMI per molecule, surprisingly, a particularly high filtration rate is possible, and, consequently, the macromers used to achieve this are particularly suitable for the synthesis of graft polyols.

The invention claimed is:

1. A process for preparing a polymer polyol dispersion, comprising reacting at least one macromer with at least one polyether polyol and also styrene and acrylonitrile, using 0.5% to 10% of the macromer, and wherein the macromer is prepared by a process comprising catalytically reacting a hexafunctional polyol P comprising a polyether polyol PM with 1,1-dimethyl-meta-isopropenylbenzyl isocyanate (TMI), using 1.5 to 1.8 mol of the TMI, based on the macromer, and a catalyst K comprising dibutyltin dilaureate (DBTL), wherein the polyol P has been prepared by reacting sorbitol with at least one alkylene oxide with catalysis by a base.

2. The process for preparing a polymer polyol dispersion according to claim 1, wherein the at least one alkylene oxide comprises ethylene oxide (EO), and wherein an EO content of the macromer is between 1% and 25%.

3. The process for preparing a polymer polyol dispersion according to claim 1, wherein more than 1.5 to less than 1.8 mol of the TMI are used, based on the macromer.

4. The process for preparing a polymer polyol dispersion according to claim 1, wherein the polyol P has been prepared by reacting sorbitol with a mixture of ethylene oxide and propylene oxide with catalysis by the base, the fraction of ethylene oxide in the macromer being 1-25 wt %, based on the total mass of the macromer.

5. The process for preparing a polymer polyol dispersion according to claim 1, wherein the polyol P has been prepared by reacting sorbitol with at least one alkylene oxide with catalysis by the base, the basic catalyst being selected from the group consisting of potassium hydroxide and cesium hydroxide.

6. The process for preparing a polymer polyol dispersion according to claim 1, wherein the polyol P has a molecular weight Mw of 5000 to 25 000 g/mol, the molecular weight Mw being determined arithmetically from the OH number, determined according to DIN 53240.

7. The process for preparing a polymer polyol dispersion according to claim 1, wherein the catalyzed reaction with the TMI takes place at a temperature of 60 to 150° C., and a pressure of 0.5 to 2 bar.

8. The process for preparing a polymer polyol dispersion according to claim 1, wherein the macromer has a molecular weight Mw of 5000 to 25 000 g/mol, the molecular weight Mw being determined arithmetically from the OH number, determined according to DIN 53240.

9. A polymer polyol dispersion obtained by the process of claim 1.

10. A process for producing a polyurethane, comprising reacting a polymer polyol dispersion obtained in claim 1 with at least one di- or polyisocyanate and optionally a blowing agent.

11. The process for preparing a polymer polyol dispersion according to claim 1, further comprising filtering the dispersion.

12. The process for preparing a polymer polyol dispersion according to claim 11, wherein the filtering comprises filtering at a filtration rate of 60.9 to 68.9 g per 100 s.

* * * * *